United States Patent Office 3,577,415
Patented May 4, 1971

3,577,415
1-SUBSTITUTED-3-SUBSTITUTED
PHENOXYPYRROLIDINES
Albert Duncan Cale, Jr., Mechanicsville, Va., assignor to A. H. Robins Company, Incorporated, Richmond, Va.
No Drawing. Filed Dec. 23, 1968, Ser. No. 786,395
Int. Cl. C07d 27/04
U.S. Cl. 260—247.2
10 Claims

ABSTRACT OF THE DISCLOSURE 1-substituted-3-substituted phenoxypyrrolidines useful as anti-depressants are disclosed. The compounds are prepared from 1-methyl-3-pyrrolidinols and 1-benzyl-3-pyrrolidinols.

The present invention relates to certain novel heterocyclic organic compounds which may be referred to as 3-phenoxy-pyrrolidines and is more particularly concerned with 1-substituted-3-substituted-phenoxypyrrolidines, compositions thereof, and methods of making and using the same The compounds of the present invention may be broadly represented by the following structural formula:

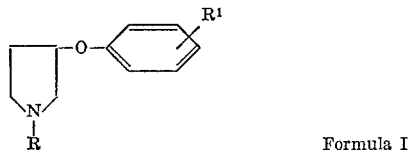

Formula I wherein;

R is benzyl, methyl and carbamoyl,
$R^1$ is carbamoyl, carboxy, aminocarbonyl, amino, benzamidomethyl, aminomethyl, hydroxymethyl, lower-alkoxy carbonyl, cyano, lower-alkyl carbonyl, acetamido, benzamido and carbamoyl amino, and
acid addition salts thereof.

The compounds of the invention represented by Formula I are generally characterized by important pharmacological activity. The activity is demonstrable when the compounds are used in the form of the free base or in the form of their non-toxic acid addition salts. The preferred form of the compounds is as their non-toxic acid addition salts for increased water solubility and ease of administration.

Acid addition salts are prepared by reacting the selected base in the known manner with an acidic component, typical mineral acids being hydrohalic, phosphoric or sulfuric acid. Salts prepared using organic acids are within the purview of the invention, the preferred organic acids being maleic, fumaric, oxalic, tartaric and citric acid.

The compounds of the invention are specifically useful in the field of comparative pharmacology. When the compounds are used and compared with other drugs as antidepressants by the method of Beryl M. Askew, Life Sciences, No. 10, pp. 725–730 (1963), they will demonstrate this action best when utilized at a dose (intraperitoneally in mice) within the range of about two to 50 mg./kg. and preferably at 2–20 mg./kg. Using the method of Askew, female mice were injected subcutaneously (s.c.) with 2 mg./kg. of reserpine in the late afternoon of the day preceding the test. Approximately 18 hours later the temperature of the mice was measured and groups of eight mice were injected intraperitoneally (i.p.) with the test drug or water. The temperature of the mice was measured four hours following the injection of the test drug or water. The activity of the compounds as antagonists of reserpine-induced hypothermia was compared with the known antidepressant control drug desmethylimipramine (DMI) and the results calculated as a percentage of DMI response among the 1-substituted-3-phenoxypyrrolidines tested. The preferred compounds are shown in Table I.

TABLE I

| Example: | Dose and route | Percent of DMI response |
|---|---|---|
| 18 | 2 mg./kg. i.p. | 56 |
| 27 | {2 mg./kg. i.p. | 45 |
|    | {20 mg./kg. i.p. | 77 |
| 28 | 2 mg./kg. i.p. | 49 |
| 30 | {2 mg./kg. i.p. | 13 |
|    | {20 mg./kg. i.p. | 35 |
| 48 | 20 mg./kg. i.p. | 83 |

It is, therefore, an object of the present invention to provide novel compounds having utility as anti-depressants. Another object is to provide methods for producing the novel compounds and methods for the utilization thereof. Additional objects will become apparent hereinafter and still others will be apparent to one skilled in the art.

In the definition of the symbols in the formulas hereof and where they appear elsewhere throughout this specification, the terms have the following significance.

The term "lower alkyl" as used herein includes straight and branched chain radicals of from one to eight carbon atoms inclusive. Examples of lower alkyl radicals are methyl, ethyl, propyl, isopropyl, butyl, isobutyl, amyl, hexyl, heptyl, and octyl radicals.

The term "carbamoyl" as used herein includes not only the primary carbamoyl group but also the secondary and tertiary carbamoyl groups as well, including N-lower-alkyl carbamoyl, N-phenylcarbamoyl, N,N-diphenylcarbamoyl, N-cycloalkyl carbamoyl, N,N-di-lower-alkyl carbamoyl and the like.

Among the suitable amino radicals included within the symbol $R^1$ are primary, secondary and tertiary amino radicals, such as unsubstituted amino ($-NH_2$), lower-alkylamino, di-lower-alkyl-amino, anilino, basic saturated monocyclic heterocyclic radicals as exemplified by morpholino, pyrrolidino and piperidino.

The following Charts I and II illustrate the process of the invention and show the various procedures involved in preparing the final products of the invention. In Charts I and II, all the symbols have the values previously assigned.

CHART I

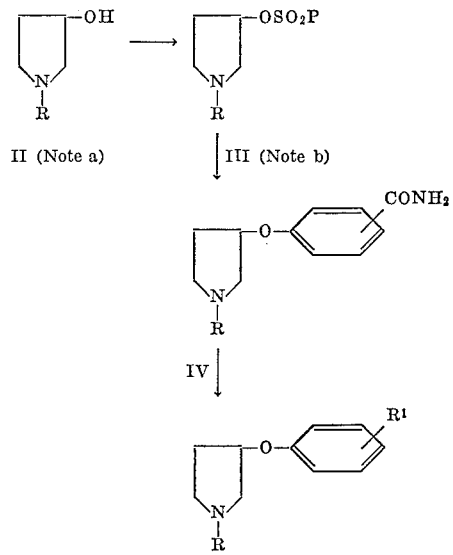

Notes:
a. R is a benzyl or a methyl radical.
b. P is an alkyl or an aryl group.

The starting materials for the novel compounds of the present invention are the 1-benzyl- and 1 - methyl-3-pyrrolidinols represented in Chart I by Formula II. The pyrrolidinols are converted to either an aryl or an alkyl sulfonyloxy compound of Formula III which is then reacted with a 2-carbamoylphenol or a 4-carbamoylphenol to give a 1-benzyl- or a 1-methyl-3-(2- and 4-carbamoylphenoxy)pyrrolidine of Formula IV. From the latter compounds represented by Formula IV, the novel compounds of Formula I are prepared as will be more fully shown hereinafter in the examples.

CHART II

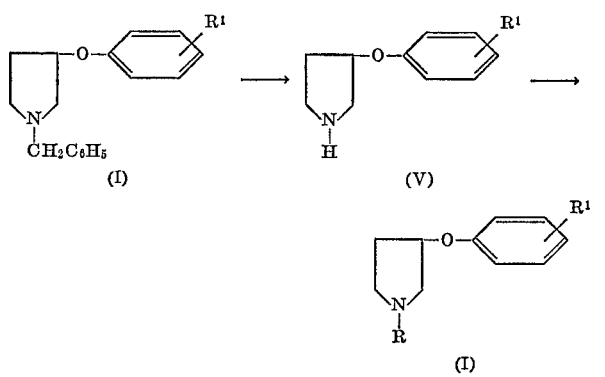

Chart II illustrates the process of the invention, whereby novel compounds within the scope of Formula I wherein R is a carbamoyl radical are prepared by hydrogenolysis of a 1-benzyl - 3 - phenoxypyrrolidine to a 3-phenoxypyrrolidine of Formula V, which is then reacted with an isocyanate or a carbamoyl halide.

As shown in Chart I, a 1-benzyl- or a 1-methyl-3-pyrrolidinol (II) is converted to a 1-benzyl- or 1-methyl-3-arylsulfonyloxypyrrolidine or a 1-benzyl- or 1-methyl-3-alkylsulfonyloxypyrrolidine by reaction with an aryl- or alkylsulfonyl halide, and allowing the thus-formed 3-sulfonyloxypyrrolidine to react with a phenol to produce a compound of Formula IV, a compound within the scope of Formula I and the starting material of the present invention.

As a general procedure for preparing the starting materials (IV), a suspension of sodamide in an appropriate solvent, e.g., dry toluene, is placed in a suitable reaction vessel such as a three-necked, round-bottom flask provided with stirrer, reflux condenser, thermometer and dropping funnel. The stirred dispersion is maintained at a temperature below 50° C., generally between 25° C. and 45° C. during the dropwise addition of a 1-substituted-3-pyrrolidinol to the reaction medium. A solution of an arylsulfonyl halide is then added to the reaction mixture while maintaining a reduced temperature, for example, about 0–10° C. Arylsulfonyl halides such as o-toluenesulfonyl chloride, p-toluenesulfonyl chloride and benzenesulfonyl chloride in toluene solution may be employed in the formation of the desired sulfonates. Stirring of the reaction mixture is continued for an additional period, generally for about six hours while allowing the pot temperature to rise gradually to ambient temperature. The reaction mixture is washed several times with cold water and the washed toluene solution dried using a suitable drying agent as, for example, sodium sulfate. After removal of the drying agent, the dried toluene solution is concentrated under reduced pressure and the residual sulfonate allowed to react with a 2-carbamoyl- or 4-carbamoylphenol preferably in the form of the sodium salt in dimethylformamide. The sulfonate in dimethylformamide is added to the solution of the phenol, preferably as an alkali metal phenate, and the pot temperature raised to a level of about 100–120° C. for an extended period such as four to eight hours. On termination of the heating period the cooled reaction mixture is partitioned between water and a suitable organic solvent, illustratively ethyl acetate. The organic layer is separated and extracted with dilute mineral acid. The acid extracts are combined, basified with dilute aqueous base and the base-insoluble oil extracted with an organic solvent. After drying over an inert drying agent, the solvent is removed by evaporation and the residual 1-substituted-3-(2- or 4-carbamoylphenoxy)pyrrolidine is recrystallized from a suitable solvent.

The following examples are given by way of illustration only and are not to be construed as limiting.

EXAMPLE 1

1-benzyl-3-(2-carbamoylphenoxy)pyrrolidine 1-benzyl-3-pyrrolidinol (19.3 g.; 0.11 mole) was added to a stirred suspension of 4.3 g. (0.11 mole) of sodium amide in 60 ml. of dry toluene maintained at 35° C. After three hours at room temperature the mixture was cooled to 20° C. and 19.0 g. (0.11 mole) of 2-toluenesulfonyl chloride was added at a rapid rate, the pot temperature maintained at 20–30° C. After stirring two hours the mixture was allowed to stand overnight at ambient temperature. The toluene solution was washed with water, dried over sodium sulfate and concentrated. The 1-benzyl-3-pyrrolidinol 2-toluenesulfonate was added to a dimethylformamide solution of 0.1 mole of the sodium salt of salicylamide prepared in 150 ml. of dimethylformamide from 13.6 g. (0.1 mole) of salicylamide and 5.4 g. (0.1 mole) of sodium methoxide. The reaction mixture was refluxed five hours, cooled, partitioned between water (500 ml.) and ethyl acetate (500 ml.). The ethyl acetate layer was acid-base extracted and the base insoluble product crystallized from isopropyl ether-ethyl acetate to give 12.5 g. (42%) of product which melted at 120.5–122° C.

*Analysis.*—Calcd. for $C_{18}H_{20}N_2O_2$ (percent): C, 72.95; H, 6.80; N, 9.46. Found (percent): C, 72.23; H, 6.78; N, 9.56.

EXAMPLE 2

1-benzyl-3-(4-carbamoylphenoxy)pyrrolidine 1-benzyl-3-(4-carbamoylphenoxy)pyrrolidine was prepared in 74% yield as described in Example 1. The compound melted at 143–145° C.

*Analysis.*—Calculated for $C_{18}H_{20}N_2O_2$ (percent): C, 72.95; H, 6.80; N, 9.45. Found (percent): C, 73.11; H, 6.80; N, 9.61.

EXAMPLE 3

1-benzyl-3-(2-morpholinylcarbonylphenoxy) pyrrolidine

A solution of 30.0 g. (0.10 mole) of 1-benzyl-3-(2-carboxyphenoxy)pyrrolidine (prepd. from 1-benzyl-3-(2-carbamoylphenoxy)pyrrolidine using the procedure of Example 28) in 100 ml. of thionyl chloride was refluxed one hour and concentrated under reduced pressure. The residue was dissolved in chloroform and concentrated to remove gaseous by-products. A solution of the residue in 150 ml. of chloroform was treated dropwise with 100 ml. of morpholine with ice-bath cooling. After fifteen minutes stirring at room temperature the chloroform solution was washed with dilute sodium hydroxide solution. The chloroform layer was concentrated and the residue distilled to give 19.0 g. (53%) of product; B.P. 235–238° C./0.1 mm.

*Analysis.*—Calculated for $C_{22}H_{26}N_2O_2$ (percent): C, 72.10; H, 7.15; N, 7.65. Found (percent): C, 71.74; H, 7.19; N, 7.76.

EXAMPLES 4–17

The physical constants of additional examples of 1-benzyl-3-phenoxypyrrolidines are given in Table I.

TABLE I

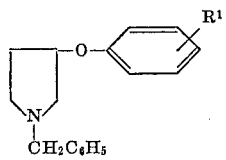

| Example | R¹ | M.P., B.P./mm., °C. | Calculated C | Calculated H | Calculated N | Found C | Found H | Found N |
|---|---|---|---|---|---|---|---|---|
| 4 | 2-(CH₃)₂NCO | 198/0.1 | 74.04 | 7.46 | 8.65 | 73.56 | 7.48 | 8.82 |
| 5 | 2-CH₃NHCO | 210–20/0.1 | 73.52 | 7.15 | 9.03 | 73.83 | 7.46 | 9.06 |
| 6 | 2-(CH₃)₂NCH₂ | 181/0.07 | 77.38 | 8.44 | 9.03 | 76.90 | 8.42 | 9.05 |
| 7 | 2-NH₂ | 180–5/0.1 | 76.08 | 7.51 | 10.44 | 76.38 | 7.53 | 10.44 |
| 8 | 2-CH₂OH | 180–3/0.1 | 76.29 | 7.47 | 4.94 | 76.12 | 7.46 | 4.86 |
| 9 | 2-CH₂NH₂ | 175–80/0.1 | 76.56 | 7.85 | 9.92 | 76.80 | 8.05 | 9.74 |
| 10 | 2-COOC₂H₅ | 197–9/0.1 | 73.82 | 7.12 | 4.31 | 73.34 | 6.89 | 4.36 |
| 11 | 2-CN | 184–6/0.1 | 77.67 | 6.52 | 10.07 | 77.74 | 6.61 | 10.01 |
| 12 | 2-COOCH₃ | 185–8/0.1 | 73.29 | 6.80 | 4.50 | 73.02 | 6.81 | 4.65 |
| 13 | 2-CH₃CO | 181–5/0.15 | 77.26 | 7.17 | 4.74 | 77.01 | 7.31 | 4.88 |
| 14 | 4-CN | 75.5–77 | 77.67 | 6.52 | 10.07 | 77.45 | 6.52 | 10.17 |
| 15 | 2-CH₂NCH₂CH₂OCH₂CH₂ | 189–94/0.05 | 74.96 | 8.01 | 7.95 | 75.20 | 8.26 | 7.75 |
| 16 [1] | 4-COC₃H₇ | 143–5 | 70.08 | 7.28 | 3.89 | 70.00 | 7.30 | 4.02 |
| 17 [2] | 2-CH₃CONH | 139–41 | 64.77 | 6.15 | 6.57 | 64.82 | 6.15 | 6.67 |

[1] Hydrochloride salt. [2] Maleate salt.

EXAMPLE 18

3-(2-carbamoylphenoxy)pyrrolidine hydrochloride

An ethanol (150 ml.) solution containing 60 g. (0.2 mole) of 1-benzyl-3-(2-carbamoylphenoxy)pyrrolidine and 5 g. of 10% palladium-charcoal catalyst was shaken in three atmospheres of hydrogen at 60° C. The reduced mixture workup gave 34.5 g. (81.5%) of oil, B.P. 190–195° C./0.1 mm. The hydrochloride salt melted at 155–158° C. after recrystallization from methyl isobutyl ketone-isopropanol.

*Analysis.*—Calculated for $C_{11}H_{15}ClN_2O_2$ (percent): C, 54.43; H, 6.23; N, 11.54. Found (percent): C, 54.57; H, 6.33; N, 11.47.

EXAMPLE 19

3-(2-morpholinylcarbonylphenoxy)pyrrolidine oxamate 3-(2-morpholinylcarbonylphenoxy)pyrrolidine was prepared by hydrogenolysis of the 1-benzyl precursor using the procedure of Example 18. The oxamate salt melted at 185° C.

*Analysis.*—Calculated for $C_{17}H_{23}N_3O_6$ (percent): C, 55.88; H, 6.34; N, 11.50. Found (percent): C, 55.83; H, 6.47; N, 11.73.

EXAMPLES 20–25

The physical constants of additional examples of 3-phenoxy-pyrrolidines are given in Table II.

EXAMPLE 26

1-methyl-3-(2-carbamoylphenoxy)pyrrolidine 1-methyl-3-pyrrolidinol-2-toluenesulfonate was prepared as described in Example 1 from 202 g. (2.0 moles) of 1-methyl-3-pyrrolidinol, 85.6 g. (2.2 moles) of sodium amide and 381 g. (2.0 moles) of 2-toluenesulfonyl chloride. The sulfonate was reacted with 247 g. (2.0 moles) of salicylamide to yield 170 g. (38%) of product which melted at 116–118° C.

*Analysis.*—Calculated for $C_{12}H_{16}N_2O_2$ (percent): C, 65.43; H, 7.32; N, 12.72. Found (percent): C, 65.28; H, 7.28; N, 12.77.

EXAMPLE 27

1-methyl-3-(4-carbamoylphenoxy)pyrrolidine 1-methyl-3-(4-carbamoylphenoxy)pyrrolidine (M.P. 200–202° C. from ethanol) was prepared in 68% yield by the method of Example 26.

*Analysis.*—Calculated for $C_{12}H_{16}N_2O_2$ (percent): C, 65.43; H, 7.32; N, 12.72. Found (percent): C, 65.98; H, 7.41; N, 12.73.

EXAMPLE 28

1-methyl-3-(2-carboxyphenoxy)pyrrolidine

A solution containing 62.5 g. (1.55 moles) of sodium hydroxide, 170.4 g. (0.775 mole) of 1-methyl-3-(2-carbamoylphenoxy)pyrrolidine and one liter of water was refluxed 24 hours, cooled to room temperature, the pH of the solution adjusted to 7, filtered and the filtrate concentrated under reduced pressure. The residue was boiled with isopropanol, filtered and concentrated. The solid residue was recrystallized from isopropanol-water to yield 16.0 g. of material which melted at 178–180° C.

TABLE II

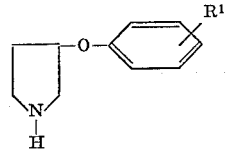

| Example | R¹ | M.P., B.P./mm. °C. | Calculated C | Calculated H | Calculated N | Found C | Found H | Found N |
|---|---|---|---|---|---|---|---|---|
| 20 | 2-COOH | 240 | 63.75 | 6.32 | 6.76 | 63.51 | 6.24 | 6.62 |
| 21 | 2-COC₃H₇ | 133–5/0.1 | 66.36 | 7.28 | 5.95 | 66.57 | 7.27 | 6.05 |
| 22 [1] | 2-NH₃ | 176–8 | 57.13 | 6.16 | 9.52 | 57.13 | 6.13 | 9.13 |
| 23 [1] | 2-CH₃CONH | 162–5 | 57.13 | 5.99 | 8.33 | 56.74 | 6.01 | 8.24 |
| 24 [2] | 2-(3,4,5-CH₃OC₆H₂)CONH | 252–4 | 58.75 | 6.16 | 6.85 | 58.67 | 6.09 | 7.04 |
| 25 | 4-CONH₂ | 169–71 | 64.06 | 6.84 | 13.60 | 64.24 | 6.83 | 13.51 |

[1] Fumarate salt. [2] Hydrochloride salt.

*Analysis.*—Calculated for $C_{12}H_{15}NO_3$ (percent): C, 65.14; H, 6.83; N, 6.33. Found (percent): C, 65.19; H, 6.84; N, 6.39.

EXAMPLE 29

1-methyl-3-(2-aminophenoxy)pyrrolidine 1-methyl-3-pyrrolidinol benzenesulfonate (33.8 g.; 0.14 mole) was added to 150 ml. of dimethylformamide containing 7.8 g. (0.144 mole) of sodium methoxide and 15 g. (0.138 mole) of 2-aminophenol. After five hours at 100° C. the cooled mixture was partitioned between chloroform and water. The chloroform solution was acid-base extracted and the base insoluble material crystallized from isooctane. The solid was sublimed at 90° C./0.1 mm.; the product melted at 86–93° C.

*Analysis.*—Calculated for $C_{11}H_{16}N_2O$ (percent): C, 68.71; H, 8.39; N, 14.57. Found (percent): C, 68.43; H, 8.42; N, 14.30.

EXAMPLE 30

1-methyl-3-[4-(3,4,5-trimethoxybenzamidomethyl)phenoxy]pyrrolidine

To a solution of 19.5 g. (0.095 mole) of 1-methyl-3-(4-aminomethylphenoxy)pyrrolidine in 100 ml. of chloroform was added dropwise a solution of 23.1 g. (0.1 mole) of 3,4,5-trimethoxybenzoyl chloride in 75 ml. of chloroform. The mixture was stirred 0.5 hour, extracted with dilute sodium hydroxide solution and concentrated. The residue was crystallized from ethyl acetate-isopropyl ether. The product weighed 12.0 g. (32%) and melted at 131–137° C.

*Analysis.*—Calculated for $C_{22}H_{28}N_2O_5$ (percent): C, 65.99; H, 7.05; N, 7.00. Found (percent): C, 65.63; H, 7.01; N, 6.75.

EXAMPLES 31–47

The physical constants of additional examples of 1-methyl-3-phenoxypyrrolidines are given in Table III.

TABLE III

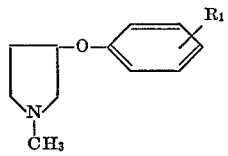

| | | | Calculated | | | Found | | |
|---|---|---|---|---|---|---|---|---|
| Example | $R^1$ | M.P., B.P./mm., °C. | C | H | N | C | H | N |
| 31 [1] | 2-COOCH$_3$ | 87–9 | 58.11 | 6.03 | 3.99 | 58.39 | 6.14 | 4.02 |
| 32 | 2-CON(CH$_3$)$_2$ | 142–4/0.1 | 67.71 | 8.12 | 11.28 | 67.51 | 8.09 | 11.05 |
| 33 | 2-CONCH$_2$CH$_2$OCH$_2$CH$_2$ | 180–4/0.1 | 66.18 | 7.64 | 9.65 | 65.17 | 7.60 | 9.61 |
| 34 [1] | 2-CONHC$_6$H$_5$ | 155–7 | 64.06 | 5.87 | 6.79 | 63.83 | 5.84 | 6.62 |
| 35 | 2-CONH(3-CF$_3$C$_6$H$_4$) | 94–6 | 62.61 | 5.27 | 7.69 | 62.61 | 5.19 | 7.63 |
| 36 [2] | 2-NHCOC$_6$H$_5$ | 177–9 | 64.95 | 6.36 | 8.42 | 64.60 | 6.35 | 8.41 |
| 37 [3] | 2-NHCON(C$_6$H$_5$)$_2$ | 222–5 | 55.93 | 5.09 | 8.15 | 56.03 | 5.09 | 8.05 |
| 38 | 2-CH$_2$NH$_2$ | 115–20/.05 | 69.87 | 8.79 | 13.58 | 69.84 | 9.04 | 13.18 |
| 39 | 2-CH$_2$NCH$_2$CH$_2$OCH$_2$CH$_2$ | 143/.05 | 69.53 | 8.75 | 10.14 | 69.19 | 8.77 | 10.02 |
| 40 | 2-CH$_2$N(CH$_3$)$_2$ | 103–7/.05 | 71.75 | 9.46 | 11.96 | 71.46 | 9.59 | 11.52 |
| 41 | 4-CH$_2$NH$_2$ | 124–6/.13 | 69.87 | 8.79 | 13.58 | 70.19 | 8.96 | 13.23 |
| 42 | 4-CN | 55–7 | 71.25 | 6.98 | 13.85 | 71.06 | 7.00 | 13.83 |
| 43 [2] | 4-COC$_3$H$_7$ | 120–3 | 61.52 | 7.92 | 4.78 | 61.69 | 7.75 | 5.12 |
| 44 | 2-NHCO(3,4,5-CH$_3$OC$_6$H$_2$) | 115–16 | 65.26 | 6.78 | 7.25 | 65.45 | 6.85 | 7.19 |
| 45 | 2-CN | 121/0.1 | 71.25 | 6.98 | 13.85 | 71.04 | 7.26 | 13.78 |
| 46 | 2-COCH$_3$ | 118/0.1 | 71.20 | 7.82 | 6.39 | 71.56 | 7.98 | 6.22 |
| 47 | 3,4-di-CH$_3$ | 185/30 | 76.05 | 9.33 | 6.82 | 75.87 | 9.18 | 6.78 |

[1] Fumarate salt. [2] Hydrochloride salt. [3] Hydroiodide salt.

EXAMPLE 48

1-[N-cyclopentyl-N-(3-trifluoromethylphenyl)carbamoyl]-3-(2-morpholinylcarbonylphenoxy)pyrrolidine A solution of 5.85 g. (0.021 mole) of 3-(2-morpholinylcarbonylphenoxy) pyrrolidine in 20 ml. of pyridine was treated with 6.15 g. (0.021 mole) of N-cyclopentyl-N-(3-trifluoromethylphenyl)-carbamoyl chloride. The mixture was stirred one hour, heated 0.5 hour on a steam bath, concentrated and the residue partitioned between chloroform and dilute hydrochloric acid. From the chloroform layer 3.34 g. (30%) of product was obtained; M.P. 95–107° C.

*Analysis.*—Calculated for $C_{28}H_{32}N_3O_4F_3$ (percent): C, 63.26; H, 6.07; N, 7.91. Found (percent): C, 63.31; H, 6.09; N, 7.83.

EXAMPLES 49–50

The physical constants of additional examples of 1-carbamoyl-3-phenoxypyrrolidines are given in Table IV.

TABLE IV

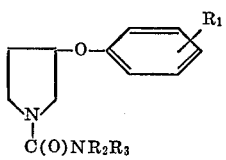

| | | | | | Calculated | | | Found | | |
|---|---|---|---|---|---|---|---|---|---|---|
| Example | $R^1$ | $R^2$ | $R^3$ | M.P., B.P./mm. °C. | C | H | N | C | H | N |
| 49 | 2-CONCH$_2$CH$_2$OCH$_2$CH$_2$ | C$_6$H$_5$ | C$_6$H$_5$ | 189–98 | 71.32 | 6.20 | 8.91 | 71.04 | 6.18 | 8.70 |
| 50 | Same as above | Same | CH$_3$ | 134–44 | 67.46 | 6.65 | 10.26 | 67.63 | 6.72 | 10.27 |

FORMULATION AND ADMINISTRATION

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic, and silicic acids, magnesium stearate, and polyvinyl pyrrolidone.

For parenteral administration, the carrier or excipient may be a sterile, parenterally acceptable liquid; e.g., water or a parenterally acceptable oil; e.g., arachis oil contained in ampules.

Advantageously, the compositions may be formulated as dosage units, each unit being adapted to supply a fixed dose of active ingredients. Tablets, capsules, coated tablets and ampules are examples of preferred dosage unit forms according to the invention. Each dosage unit adapted for oral administration can conveniently contain 5 to 100 mg. and preferably 10 to 50 mg. of the active ingredient, whereas each dosage unit adapted for intramuscular administration can conveniently contain 5 to 100 mg. and preferably 10 to 25 mg. of the active ingredient.

The following formulations are representative for all of the pharmaceutically active compounds of the invention.

(1) Capsules: Capsules of 5, 25, and 50 mg. of active ingredient per capsule are prepared. With the higher amounts of active ingredients, reduction may be made in the amount of lactose.

Typical blend for encapsulation:

| | Per capsule, mg. |
|---|---|
| Active ingredient | 5.0 |
| Lactose | 296.7 |
| Starch | 129.0 |
| Magnesium stearate | 4.3 |
| Total | 435.0 |

(2) Tablets: A typical formulation for a tablet containing 5 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.2 |
| (6) Calcium stearate | 0.9 |
| Total | 170.3 |

Uniformly blend 1, 2, 4 and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 mg. tablet, ingredients:

| | Per tablet, mg. |
|---|---|
| Active ingredient | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable: 2% sterile solution.

| | Per cc. |
|---|---|
| Active ingredient | 20 mg. |
| Preservative, e.g., chlorobutanol | 0.5% w./v. |
| Water for injection, q.s. | |

Prepare solution, clarify by filtration, fill into vials, seal, and autoclave.

Various modifications in the compounds, compositions and methods of the invention wil be apparent to one skilled in the art and may be made without departing from the spirit or scope thereof, and it is therefore to be understood that the invention is to be limited only by the scope of the appended claims.

I claim:
1. A compound selected from
(a) 1-substituted - 3 - substituted-phenoxypyrrolidines having the formula:

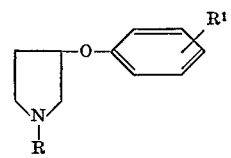

wherein;

R is selected from the group consisting of benzyl, methyl and carbamoyl, $R^1$ is selected from the group consisting of carbamoyl, carboxy, aminocarbonyl wherein amino is primary amino, lower-alkylamino, di-lower-alkylamino, morpholinyl, phenylamino and m-trifluoromethylphenylamino, primary amino, 3,4,5-trimethoxybenzamidomethyl, aminomethyl wherein amino is primary amino, di-lower-alkylamino and morpholinyl, hydroxymethyl, lower-alkoxy carbonyl, cyano, lower-alkyl carbonyl, acetamido, benzamido and carbamoyl amino, and (b) acid addition salts thereof.

2. A compound as defined in claim 1 wherein R is methyl and $R^1$ is selected from the group consisting of carbamoyl, carboxy and 3,4,5-trimethoxybenzamidomethyl.

3. A compound as defined in claim 2 wherein $R^1$ is 2-carbamoyl.

4. A compound as defined in claim 2 wherein $R^1$ is 4-carbamoyl.

5. A compound as defined in claim 2 wherein $R^1$ is 4-(3,4,5-trimethoxybenzamidomethyl).

6. A compound as defined in claim 1 wherein R is carbamoyl and $R^1$ is aminocarbonyl wherein amino is primary amino, lower-alkylamino, di-lower-alkylamino, morpholinyl, phenylamino and m-trifluoromethylphenylamino.

7. A compound as defined in claim 6 wherein R is N,N-diphenylcarbamoyl.

8. A compound as defined in claim 6 wherein R is N-cyclopentyl-N-(3-trifluoromethylphenyl)carbamoyl.

9. A compound as defined in claim 8 wherein $R^1$ is morpholinocarbonyl.

10. A compound as defined in claim 9 wherein $R^1$ is 2-morpholinocarbonyl.

References Cited

Wagner et al.: Synthetic Organic Chemistry (1953), pp. 228–29, 647, 665, 822–23.

ALEX MAZEL, Primary Examiner

J. A. NARCAVAGE, Assistant Examiner

U.S. Cl. X.R.

260—326.3, 326.5; 424—248, 274